UNITED STATES PATENT OFFICE.

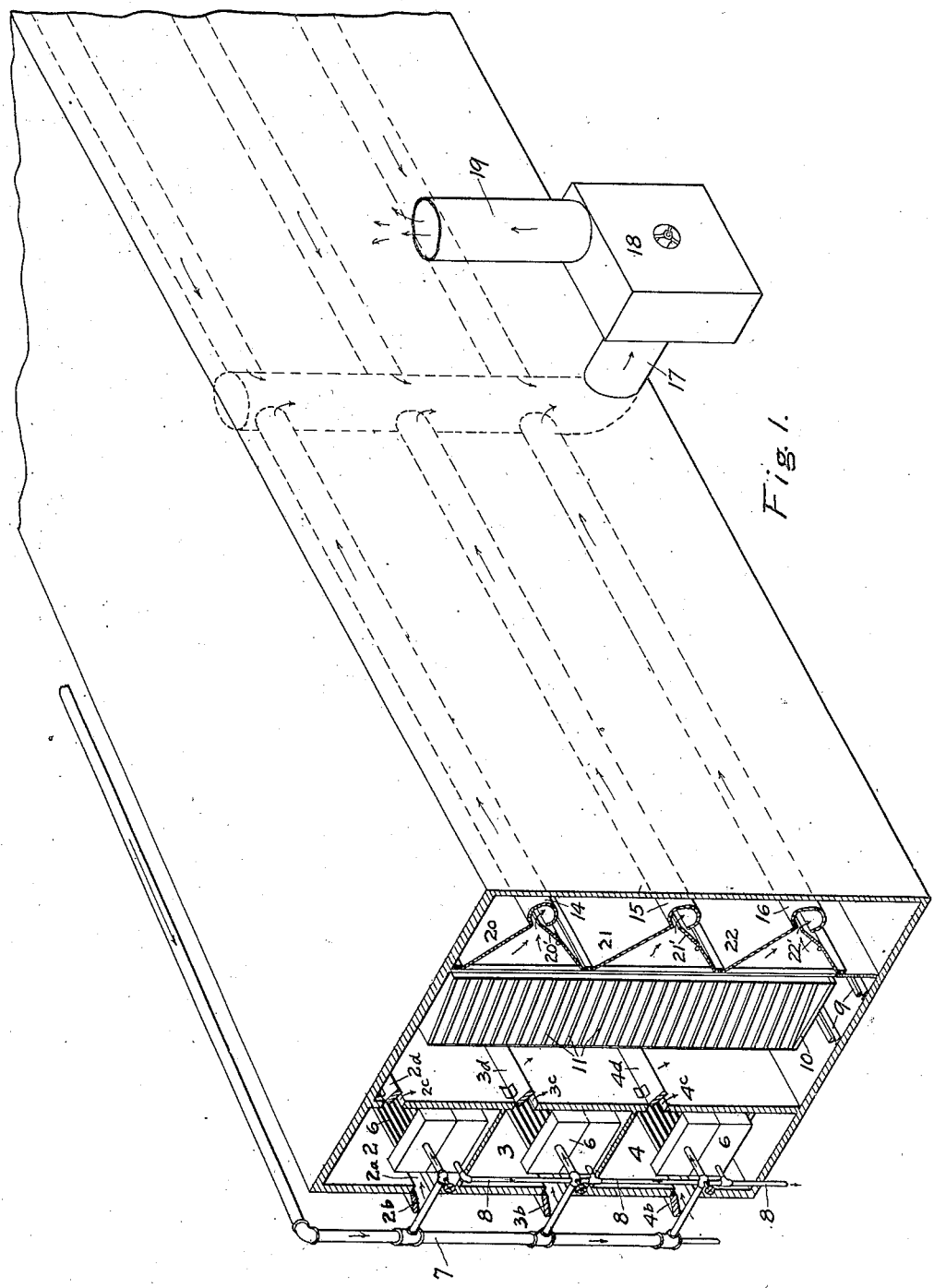

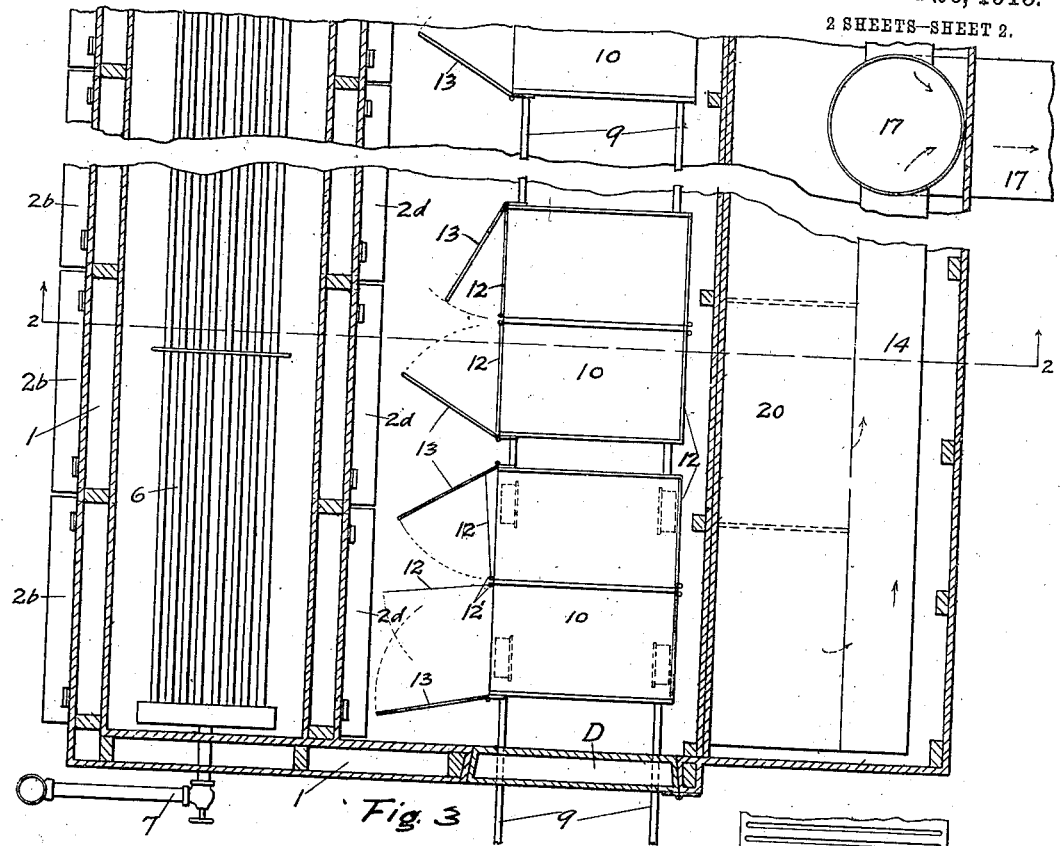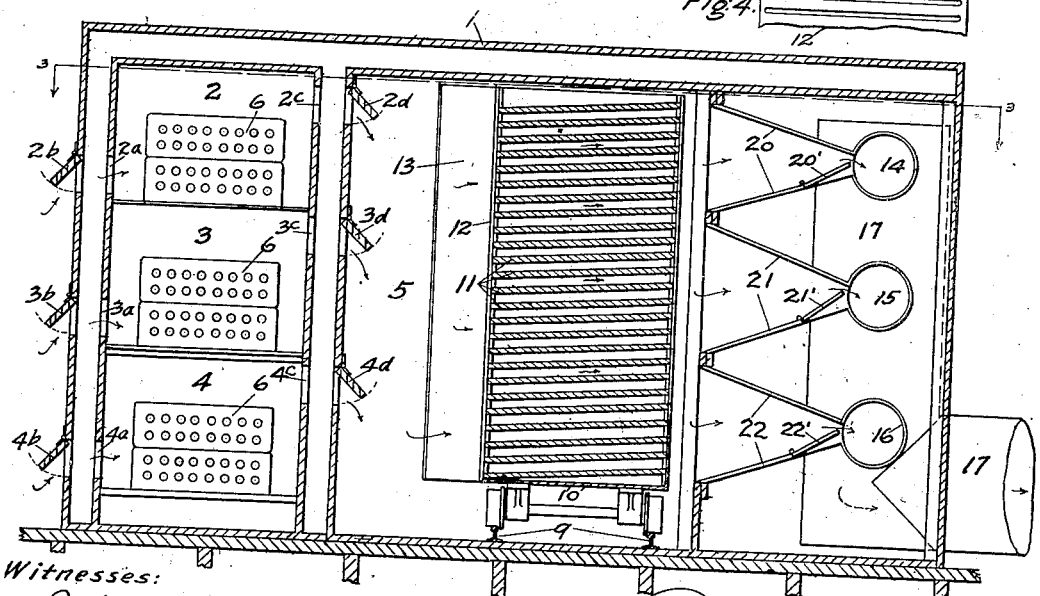

ROBERT REA, OF PORTLAND, OREGON.

DRIER.

1,126,567.

Specification of Letters Patent.

Patented Jan. 26, 1915.

Application filed August 10, 1914. Serial No. 356,007.

*To all whom it may concern:*

Be it known that I, ROBERT REA, a citizen of the United States, residing in the city of Portland, county of Multnomah, and State of Oregon, have invented certain new and useful Improvements in Driers, of which the following is a specification.

My invention relates to driers, and more particularly to certain improvements in the general construction and arrangement and operation of driers for drying fruits, vegetables and the like, and by means of which improvements I am able to get better results from all parts of the drier, because of my improved means of heating and circulating the air through the drying chambers.

My invention is of the class sometimes referred to as the "tunnel" driers, and while the housing of my drier can be extended to any desired length, instead of taking the air in lengthwise thereof, I take it in through the side and crosswise thereof, around heating pipes extending lengthwise of the housing, but arranged at different levels with horizontal dividing floors therebetween, and cause it to be passed through the tray frames crosswise thereof. Thus by drawing the air across the housing instead of lengthwise thereof, the effect is better because the distance the air must travel is much less.

My drier is so designed that much standard material can be used in its construction, and the amount of air, the temperature thereof, and the speed thereof, can be regulated so as to get the best results.

In order that others may thoroughly understand my invention, I have shown one practical embodiment thereof in the accompanying sheet of drawings, which I will now describe.

Figure 1 is a perspective sectional view of the drier embodying my invention; Fig. 2 is a vertical sectional view thereof taken on line 2—2 of Fig. 3; Fig. 3 is a horizontal sectional view thereof on line 3—3 of Fig. 2; and Fig. 4 is a fragmentary face view showing a slotted plate or cover used at opposite sides of the cars of trays to inclose the trays and to control the admission of the air across the heating tray chamber thus formed.

Referring to the drawings, the housing 1 is shown to be of square construction in cross section, and may be extended to any desired length and constructed of any suitable material, preferably of double construction. Along one side of the housing, I have arranged, one above the other, three heating appartments, as 2, 3, and 4, with the middle portion 5 of said housing constituting the main drying chamber, and at the opposite side of the housing is the mechanism for causing the air to move through the heating appartments and across the drying chamber.

Air is admitted to the heating chambers 2, 3 and 4, through openings $2^a$, $3^a$ and $4^a$, extending lengthwise thereof, and controlled by drop doors $2^b$, $3^b$, and $4^b$. Mounted in each of said heating chambers, extending lengthwise thereof, is a series of heating pipes, 6, each series being connected with a general supply pipe 7, and each being connected with a drain pipe 8, as clearly indicated in Fig. 1 with suitable valves for regulating the admission of steam or other heating medium to each series.

The heating chambers 2, 3 and 4 are provided with out let openings, $2^c$, $3^c$ and $4^c$, near their tops, with drop doors $2^d$, $3^d$ and $4^d$, for controlling the same and for directing the air across the drying chamber 5.

Mounted in the middle chamber 5, to one side thereof, is a track 9, upon which suitable cars 10 are run into the drying chamber. The drying trays 11 are mounted upon these cars in an inclined position, and are spaced apart so that the heated air from the heating chambers passes directly between the trays and over and around the matter thereupon.

In order to increase the velocity of the air through the tray frames, I provide at opposite sides thereof sheet metal plates or covers, as 12, a fragmentary view of which is shown in Fig. 4, having therein transversely extending, narrow slots, which are arranged to register with the spaces between the trays, but are narrower. These plates may be hinged in the middle of the cars, if desired, as at 12', Fig. 3, so that they can be opened out to permit the insertion and removal of the supporting trays 11. I have also provided, preferably upon the tray cars, swinging doors, such as 13—13, which can be swung to different positions across the open way in front of the trays, as clearly indicated in Fig. 3, for the purpose of directing more or less heated air through one series of trays, or through one portion thereof, as at one end of a car of trays, as will be readily understood from the drawings. These doors also prevent the passing of the air lengthwise of the drying chamber and tend to direct it crosswise thereof. These doors 13 can be swung around flatwise against the ends of the cars in an out-of-the-way position when desired.

At the opposite side of the tray cars and in the remaining space of the housing are three suction pipes, 14, 15 and 16, extending lengthwise of the housing at different levels, corresponding to the levels of the three heating chambers, 2, 3 and 4, and are connected with a main pipe 17, which is connected directly to a fan, at 18, which operates to draw the air through the housing and discharges it through the pipe 19, Fig. 1. The pipes 14, 15 and 16, are open along their inner sides, next to the back sides of the trays, and are provided with flaring extension members, as 20, 21 and 22, which form funnel-like connections from a point near the rear of the trays 11 to the respective pipes 14, 15 and 16, as shown, these flaring connections corresponding, respectively, to the area directly opposite the three heating chambers 2, 3 and 4. Damper-like members 20', 21' and 22' are also provided, whereby the openings to the pipes 14, 15 and 16, can be regulated, as conditions call for more or less air through any series of trays.

The housing can be as long as may be practical and accommodate as many cars of trays as will stand on the track therein. The housing is closed over the track by a suitable door, as d, Fig. 3, also of double construction. By drawing the air in crosswise of the housing, I avoid the necessity for drawing it any considerable distance, as is the case where the air passes lengthwise of the housing. By drawing it in at three different levels, through three different heating chambers at different levels, I get a more uniform result, and the treatment of the material on the lower trays is the same as that on the upper trays. By providing the swinging doors in the walk-way, in front of the tray cars, I am able to direct the heated air where most needed and to prevent its circulating lengthwise of the drying chamber. And by providing the slotted fronts and backs, 12, for the tray cars, the heated air drawn through the cars of trays, crosswise thereof, is caused to move faster because of the reduced size of the passageways into the trays of matter being dried, and thus better drying results are secured.

I am aware that changes can be made from the embodiment of my invention as here illustrated and described without departing from the spirit thereof, and I do not limit the invention to this particular form, except as I may be limited by the hereto appended claims.

I claim,—

1. In a drier of the character referred to, a housing having arranged therein at one side thereof, a plurality of heating chambers one above the other with heating means in each, and having along side thereof a drying chamber, means for supporting drying trays in said drying chamber in vertical tiers, a plurality of air pipes connected one above the other with a fan and having flaring extension members from their sides to points adjacent said drying trays and opposite said heating chambers, and means for regulating the admission and passage of air through said several heating chambers, across said drying chambers and drying trays to said air pipes, substantially as described.

2. In a drier of the character referred to, in combination, a drying chamber, a track therein, cars adapted to support a series of drying trays thereon, and door members mounted to be swung across the drying chamber at various angles in front of said trays, for the purpose referred to.

3. In a drying apparatus of the character referred to, a drying chamber, means for heating and supplying heated air thereto, and means for causing said heated air to pass across said drying chamber comprising a pipe connected with a fan and open along its side and having flaring extension members opening toward said drying chamber, substantially as described.

4. A drier of the character referred to comprising a long housing, a plurality of heating chambers arranged one above the other and extending along one side thereof, with openings at opposite sides to permit the passage of air across the same, means therein for heating said air, a track extending lengthwise of said housing adjacent said heating chambers, cars of drying trays for said track, a plurality of air pipes arranged along said housing one above the other and open along their sides next to said trays and having flaring extensions toward said trays, and a fan connected to said air pipes, for drawing air therethrough, substantially as described.

5. A drier of the character referred to comprising a long housing, a plurality of heating chambers arranged one above the other and extending along one side thereof, with openings at opposite sides to permit the passage of air across the same, means therein for heating said air, means for controlling said openings, tiers of drying trays arranged along side of said heating chambers, door members from said tiers of trays and projecting toward said heating chambers, said trays being supported in inclined positions, a plurality of air pipes arranged along the opposite side of said trays and having their sides open and provided with flaring extensions toward said trays, and a fan connected with said air pipes for causing a circulation of air through said housing crosswise thereof, substantially as described.

Signed at Portland, Multnomah county, Oregon, this 3rd day of August, 1914.

ROBERT REA.

In presence of—
 CLYDE EVANS,
 F. E. LITZENBERG.